(12) United States Patent
Narumi et al.

(10) Patent No.: US 9,299,003 B2
(45) Date of Patent: Mar. 29, 2016

(54) IMAGE PROCESSING APPARATUS, NON-TRANSITORY COMPUTER READABLE MEDIUM, AND IMAGE PROCESSING METHOD

(71) Applicant: FUJI XEROX CO., LTD., Tokyo (JP)

(72) Inventors: Shota Narumi, Kanagawa (JP); Makoto Sasaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/555,831

(22) Filed: Nov. 28, 2014

(65) Prior Publication Data
US 2015/0347866 A1    Dec. 3, 2015

(30) Foreign Application Priority Data

May 28, 2014  (JP) ................................ 2014-110617

(51) Int. Cl.
| G06K 9/00 | (2006.01) |
| G06K 9/46 | (2006.01) |
| G06T 5/00 | (2006.01) |
| G06T 7/40 | (2006.01) |

(52) U.S. Cl.
CPC ............ *G06K 9/4661* (2013.01); *G06K 9/4652* (2013.01); *G06T 5/00* (2013.01); *G06T 7/408* (2013.01)

(58) Field of Classification Search
CPC .......... G06T 5/001; G06T 5/40; H04N 9/045; H04N 1/6027; H04N 1/60
See application file for complete search history.

(56) References Cited

U.S. PATENT DOCUMENTS 8,285,059 B2 * 10/2012 Marchesotti ............. H04N 5/57
382/167

FOREIGN PATENT DOCUMENTS

| JP | 2008-271316 A | 11/2008 |
| JP | 4308280 B2 | 8/2009 |
| JP | 2013-210709 A | 10/2013 |

OTHER PUBLICATIONS

Daniel J. Jobson, et al., The Statistics of Visual Representation, Visual Information Processing XI, Proc. SPIE, Jul. 2002, pp. 25-35, vol. 4736.
"Review Relating to Gain Processing in Image Quality Improvement based on Retinex", Journal of the Institute of Electronics, Information and Communication Engineers, Feb. 2012, pp. 342-346, vol. J95-D, No. 2.

* cited by examiner

*Primary Examiner* — Duy M Dang
(74) *Attorney, Agent, or Firm* — Sughrue Mion, PLLC

(57) ABSTRACT

Provided is an image processing apparatus including a characteristic information acquisition unit that acquires characteristic information indicating a characteristic relating to at least any one of distribution of a specific brightness region and a size of a dark and flat region in a luminance image, an enhancement degree information generation unit that generates enhancement degree information indicating a degree of enhancement of a specific component that affects image quality of the luminance image, based on the characteristic information, and a luminance reproduction image generation unit that generates a luminance reproduction image obtained by reproducing the specific component of the luminance image so as to be enhanced to a degree of enhancement indicated by the enhancement degree information.

20 Claims, 27 Drawing Sheets

TREE
(DARK REGION)

IMAGE PROCESSING APPARATUS, NON-TRANSITORY COMPUTER READABLE MEDIUM, AND IMAGE PROCESSING METHOD

CROSS-REFERENCE TO RELATED APPLICATIONS

This application is based on and claims priority under 35 USC 119 from Japanese Patent Application No. 2014-110617 filed May 28, 2014.

BACKGROUND

Technical Field

The present invention relates to an image processing apparatus, a non-transitory computer readable medium, and an image processing method.

SUMMARY

According to an aspect of the invention, there is provided an image processing apparatus including:
  a characteristic information acquisition unit that acquires characteristic information indicating a characteristic relating to at least any one of distribution of a specific brightness region and a size of a dark and flat region in a luminance image;
  an enhancement degree information generation unit that generates enhancement degree information indicating a degree of enhancement of a specific component that affects image quality of the luminance image, based on the characteristic information; and
  a luminance reproduction image generation unit that generates a luminance reproduction image obtained by reproducing the specific component of the luminance image so as to be enhanced to a degree of enhancement indicated by the enhancement degree information.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the invention will be described in detail with reference to the accompanying drawings.

Background of Invention

In the field of image processing, in order to obtain preferable reproduction or to enhance visibility, correction or enhancement related to luminance or color, such as gamma correction, saturation enhancement, band enhancement, contrast enhancement, or dynamic range correction has been performed. Further, as a visibility enhancement method using a visual characteristic, there is a method using retinex theory. The retinex theory is a basic theory for enhancing visibility by enhancing a reflectance component based on the principle that a human perceives a scene by reflectance.

In general, as a method for determining a control parameter (hereinafter, referred to as a "reproduction parameter") in reproduction accompanied by such correction or enhancement, there are a determination method using designation on a user interface (UI) of software, a mechanical determination method in software, and a combination thereof. Among these methods, in the method of mechanically determining the reproduction parameter in the software, an evaluation index for representing the goodness or poorness of the reproduction due to the reproduction parameter is necessary. In many cases, as such an evaluation index, a feature quantity of an image is calculated from a histogram, frequency or the like of the image, and the image is corrected according to the feature quantity.

On the other hand, in the present exemplary embodiments, a reproduction parameter is determined according to a feature quantity based on spatial cohesion of a specific brightness region of an input image or the degree of noise that occurs in a dark region thereof, to thereby improve visibility of the dark region.

First Exemplary Embodiment

Figure 1:
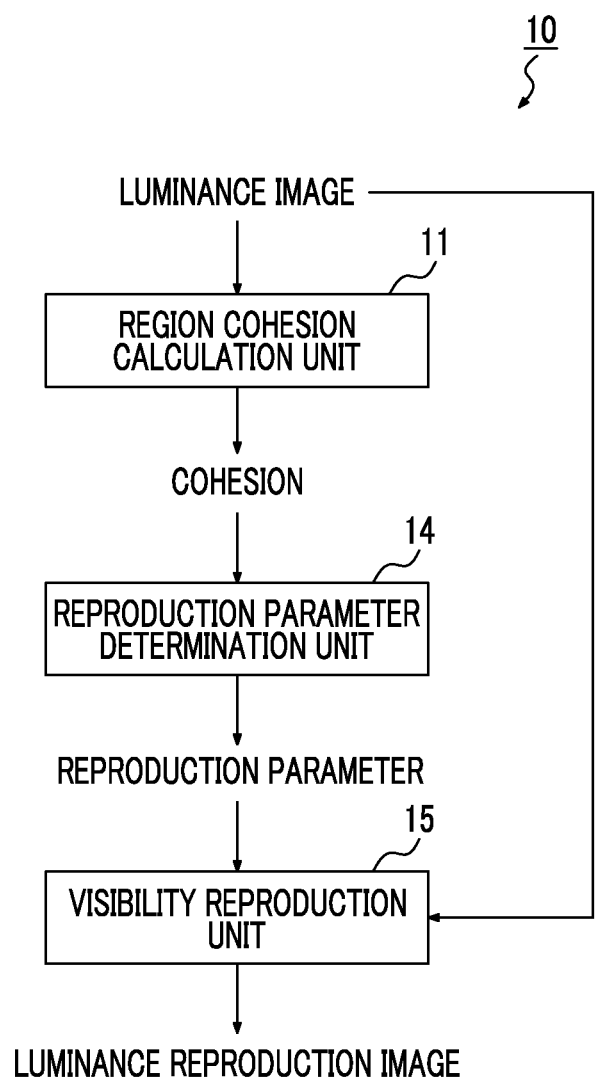
FIG. 1 is a block diagram illustrating an example of a functional configuration of an image processing apparatus according to a first exemplary embodiment of the invention.

FIG. 1 is a block diagram illustrating an example of a functional configuration of an image processing apparatus 10 according to a first exemplary embodiment of the invention. As shown in FIG. 1, the image processing apparatus 10 according to the present exemplary embodiment includes a region cohesion calculation unit 11, a reproduction parameter determination unit 14, and a visibility reproduction unit 15.

The visibility reproduction unit 15 performs reproduction for enhancing visibility for a luminance image to generate a luminance reproduction image. Here, it is assumed that the process performed by the visibility reproduction unit 15 is image enhancement. As image enhancement, enhancement such as band enhancement, contrast enhancement, luminance enhancement, or visibility enhancement may be considered. Here, band enhancement is an example of enhancement related to frequency, and contrast enhancement is an example of enhancement related to a difference between light and shade. In general, it may be said that image enhancement is enhancement of a specific component that affects the image quality of an image. In the present exemplary embodiment, description will be collectively made assuming that the image enhancement is performed by the following reproduction expression. In this description, a hat sign is assigned immediately above a character in the expression, but is assigned next to the character in a sentence.

$$\hat{I}(x,y) = \alpha I_R(x,y) + (1-\alpha)I(x,y) \quad \text{(Expression 1)}$$

Here, $I(x, y)$ represents a pixel value of an original image, which is assumed as a luminance component (V in HSV, Y in YCbCr, and L* in L*a*b*). $I_R(x, y)$ represents a pixel value of an image when the image enhancement is performed to the maximum. $\hat{I}(x, y)$ represents a pixel value of a reproduction image. Further, $\alpha$ is a reproduction parameter that represents the enhancement degree of an image, which is set as $0 \leq \alpha \leq 1$. $\hat{I}(x, y)$ represents the pixel value of the original image when $\alpha=0$, and represents the pixel value of the image when the image enhancement is performed to the maximum when $\alpha=1$.

As a process considered as conversion from $I(x, y)$ to $I_R(x, y)$ and a combination thereof, for example, the following processes may be used.

Figure 2:
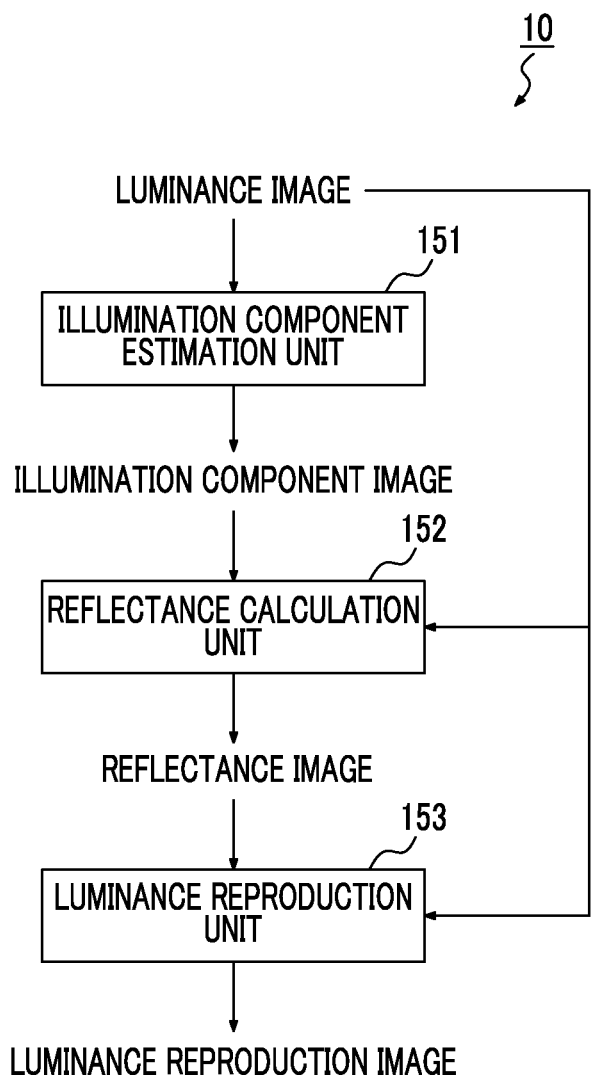
FIG. 2 is a block diagram illustrating an example of a functional configuration of a visibility reproduction unit of the image processing apparatus according to the first exemplary embodiment of the invention.

(1) Visibility enhancement based on the retinex theory
(2) Band enhancement
(3) Gamma curve enhancement
(4) Combination of gamma curve enhancement and band enhancement
(5) Combination of gamma curve enhancement and visibility enhancement based on the retinex theory
(6) Combination of band enhancement and visibility enhancement based on the retinex theory For example, (1) visibility enhancement based on retinex theory is reproduced by a configuration shown in FIG. 2. When a pixel value for a position (x, y) of a luminance image is represented as $I(x, y)$, $I(x, y)$ is divided into an illumination component $L(x, y)$ and a reflectance component $R(x, y)$ in the retinex model, as follows.

$$I(x,y) = R(x,y)L(x,y) \quad \text{(Expression 2)}$$

A problem of dividing one value into two values as in Expression 2 is generally referred to as a defect setting problem. Only if any one of the illumination component and the reflectance component is estimated using any method, the other one thereof may be calculated.

Here, an illumination component estimation unit 151 estimates $L(x, y)$ based on $I(x, y)$. As a characteristic of visual recognition, it is known that the amount of perception of one point of light that enters the retina (one pixel in an image) affects an average of peripheral luminance around the one point. The peripheral luminance corresponds to the estimated illumination component, and an illumination estimation model becomes a convolution of the following function.

$$G(x,y) = k \exp(-(x^2+y^2)/\sigma^2) \quad \text{(Expression 3)}$$

Here, k represents a coefficient for performing normalization so that when a filter size of image processing is integrated by pixels, the result becomes 1. Further, $\sigma$ represents the degree of smoothing (scale), in which as $\sigma$ is larger, a convolution image having a stronger gradation is obtained. The above-mentioned function is only an example, and any filter capable of consequently smoothing an image may be used. For example, a bilateral filter that is known as a smoothing filter that performs edge preservation may be used as a filter based on a modified function of Expression 3.

According to retinex theory, it is known that a human has a visual characteristic of estimating illumination light from the periphery of an observation region. Accordingly, a smoothed image represents the estimated illumination light. However, since a suitable scale varies according to a scene, for example, it is preferable that the estimation of the illumination light is performed by a weighted sum of images of N layers from a scale 1 to a scale N, as follows.

$$L(x, y) = \sum_{n=1}^{N} W_n G_n(x, y) \otimes I(x, y) \quad \text{(Expression 4)}$$

Here, $L(x, y)$ represents the illumination component to be estimated, $G_n(x, y)$ represents Expression 3 corresponding to a scale n, $I(x, y)$ represents the pixel value of the luminance image, $W_n$ represents a weight corresponding to the scale n, and a sign in which "x" is surrounded by O represents convolution. Here, $W_n$ may be simply set to 1/N, or may be set to be variable according to the layers. Further, it is assumed that an image having $L(x, y)$ calculated in this way as a pixel value is an illumination component image.

Meanwhile, according to Expression 2, the reflectance is calculated based on the estimated illumination component, as follows.

$$R(x,y)=I(x,y)/L(x,y) \quad \text{(Expression 5)}$$

That is, a reflectance calculation unit 152 generates the reflectance $R(x, y)$ using the pixel value $I(x, y)$ of the luminance image and the pixel value $L(x, y)$ of the illumination component image generated by the illumination component estimation unit 151. An image having the reflectance $R(x, y)$ as a pixel value is a reflectance image.

Further, a luminance reproduction unit 153 generates a luminance reproduction image using the reflectance $R(x, y)$ calculated by the reflectance calculation unit 152, the luminance image $I(x, y)$, and the reproduction parameter α, as shown in Expression 1, for example.

Hereinabove, a case where the reproduction method is applied to the visibility enhancement based on the retinex theory is described, but in the present exemplary embodiment, the reproduction method may be applied to any process that does not affect the essence of the six processes described above.

However, the reproduction parameter largely affects visibility of an image. Thus, in the present exemplary embodiment, the region cohesion calculation unit 11 calculates the cohesion, and the reproduction parameter determination unit 14 determines the reproduction parameter using the cohesion.

Figure 3:
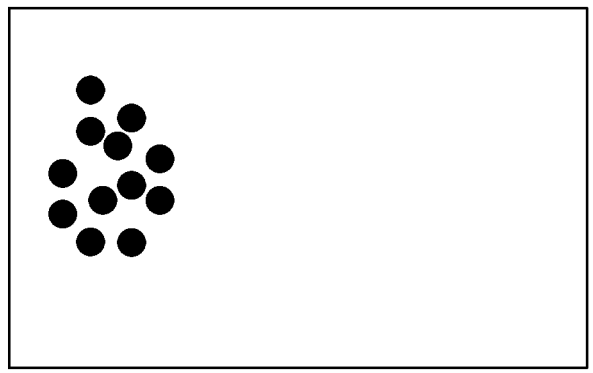
FIG. 3 is a diagram illustrating an example of spatial cohesion of a dark region.
Figure 4:
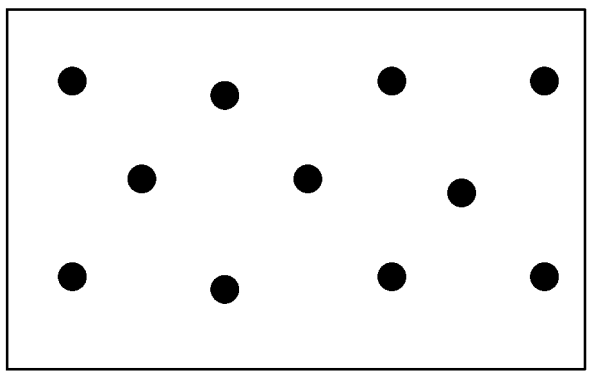
FIG. 4 is a diagram illustrating an example of spatial cohesion of a dark region.
Figure 5:
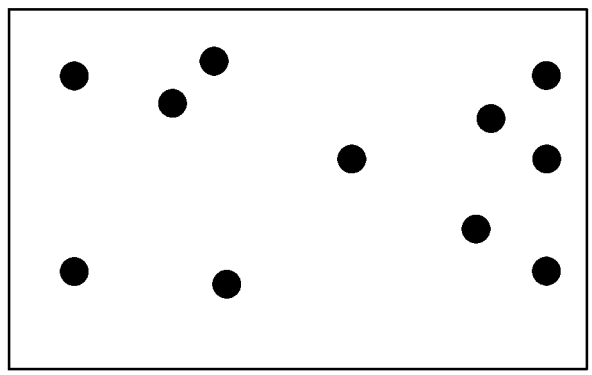
FIG. 5 is a diagram illustrating an example of spatial cohesion of a dark region.

The region cohesion calculation unit 11 divides the luminance image into plural levels respectively corresponding to plural brightness ranges, and cohesion of pixels at each level. Here, for example, the degree of spatial cohesion of a dark region is shown in FIG. 3 to FIG. 5. When the dark region is represented as a black dot, as a distribution state of the dark regions, there are a concentrated distribution state as shown in FIG. 3, a dispersed distribution state as shown in FIG. 4, and a random distribution state as shown in FIG. 5, for example. Thus, in the present exemplary embodiment, a feature quantity obtained by continuously quantifying the degree of cohesion is used as an index. As such a feature quantity, there is an average nearest neighbor distance or the like. The average nearest neighbor distance refers to an average value, in all points, of distances from the respective points to the nearest point. Accordingly, the feature quantity W may be calculated using a distance $d_i$ from a point i to the nearest point and the number of points n, according to the following expression.

$$W = \frac{1}{n}\sum_{i=1}^{n} d_i \quad \text{(Expression 6)}$$

As another feature quantity, the number of points in a predetermined range or the like may be considered, but any feature quantity obtained by quantifying the spatial cohesion of the region may be used.

In the present exemplary embodiment, as an example of characteristic information indicating a characteristic related to the distribution of the specific brightness region in the luminance image or a cohesion degree information indicating the degree of cohesion of the region, the cohesion is used, and as an example of a characteristic information acquisition unit that acquires the characteristic information or the cohesion degree information, the region cohesion calculation unit 11 is provided.

The reproduction parameter determination unit 14 determines the reproduction parameter using the spatial cohesion of the specific region calculated by the region cohesion calculation unit 11. Hereinafter, for example, a method for determining the reproduction parameter so that the reproduction parameter α becomes larger as the cohesion is higher is described.

In a first method and a second method, the reproduction parameter is determined using only the cohesion at the level of the dark region among the cohesions at the plural levels. Here, an example in which the dark region is used is described, but a region having a different brightness may be used. On the other hand, in a third method, the reproduction parameter is determined using the cohesions at the plural levels.

First Method

Figure 6:
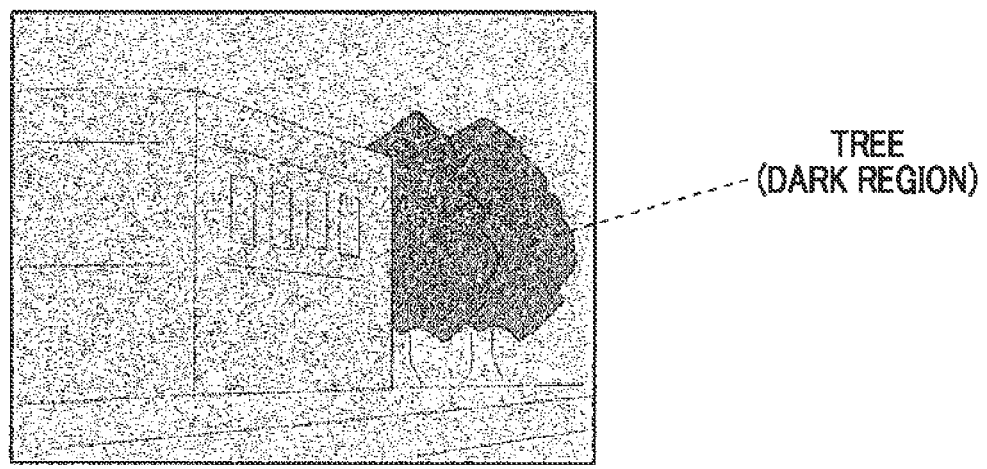
FIG. 6 is a diagram illustrating an example of a scene image for description of cohesion of a dark region.
Figure 7:
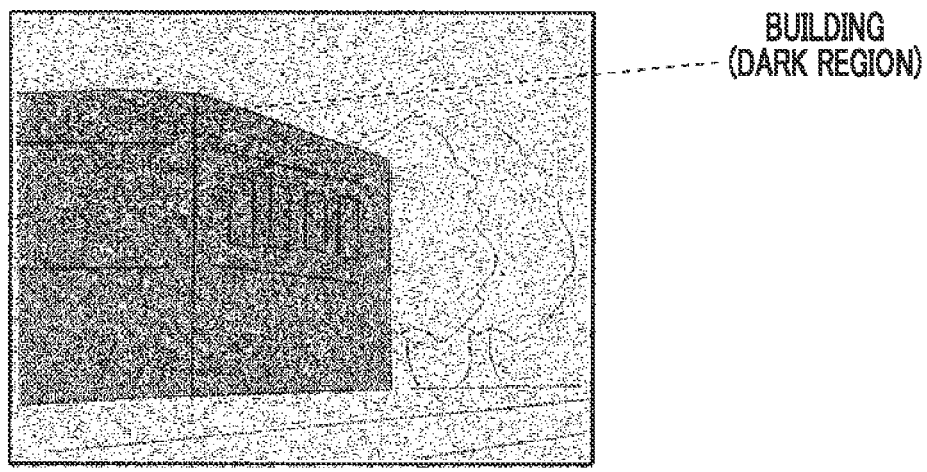
FIG. 7 is a diagram illustrating an example of a scene image for description of cohesion of a dark region.
Figure 8:
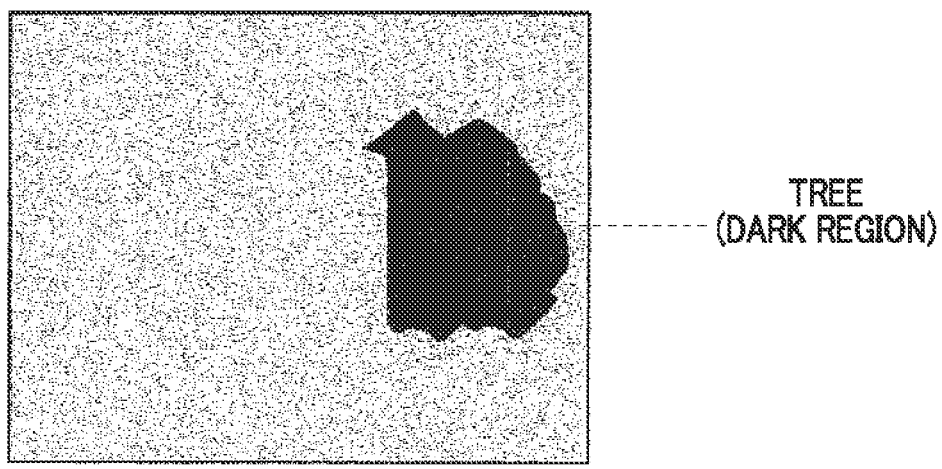
FIG. 8 is a diagram illustrating an example of an image obtained by binarizing a scene image for description of cohesion of a dark region.
Figure 9:
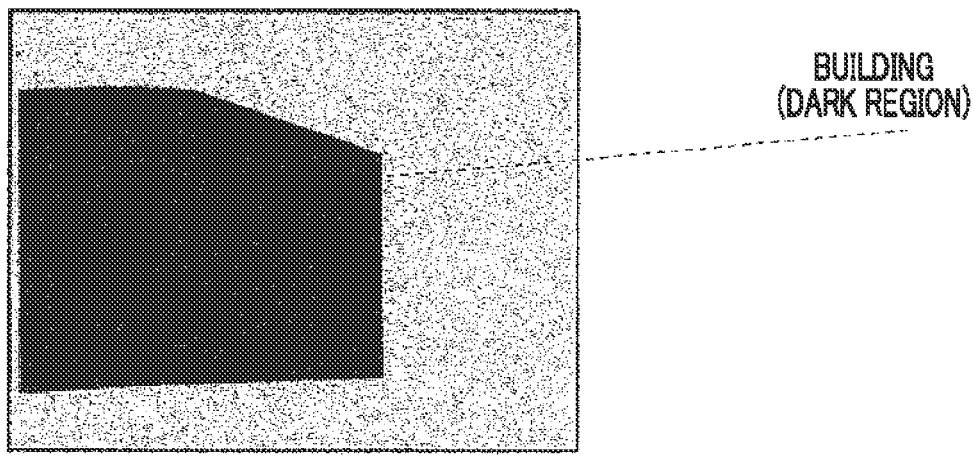
FIG. 9 is a diagram illustrating an example of an image obtained by binarizing a scene image for description of cohesion of a dark region.

The description will be made using the cohesion of a dark region in a scene image shown in FIGS. 6 and 7. In FIG. 6, a tree portion is a dark region having poor visibility, and in FIG. 7, a building portion is a dark region having poor visibility. FIGS. 8 and 9 show images obtained by binarizing images shown in FIGS. 6 and 7, respectively. In this example, the image shown in FIG. 9 is large in the area of the dark region, and is high in the cohesion thereof, compared with the image shown in FIG. 8. Thus, in the first method, the image shown in FIG. 9 is determined as an image in which the strength of the reproduction parameter is to be increased, compared with the image shown in FIG. 8. As the above-described binarization method, any method capable of extracting a dark region having poor visibility, such as a discriminant analysis, may be used.

Second Method

Figure 10:
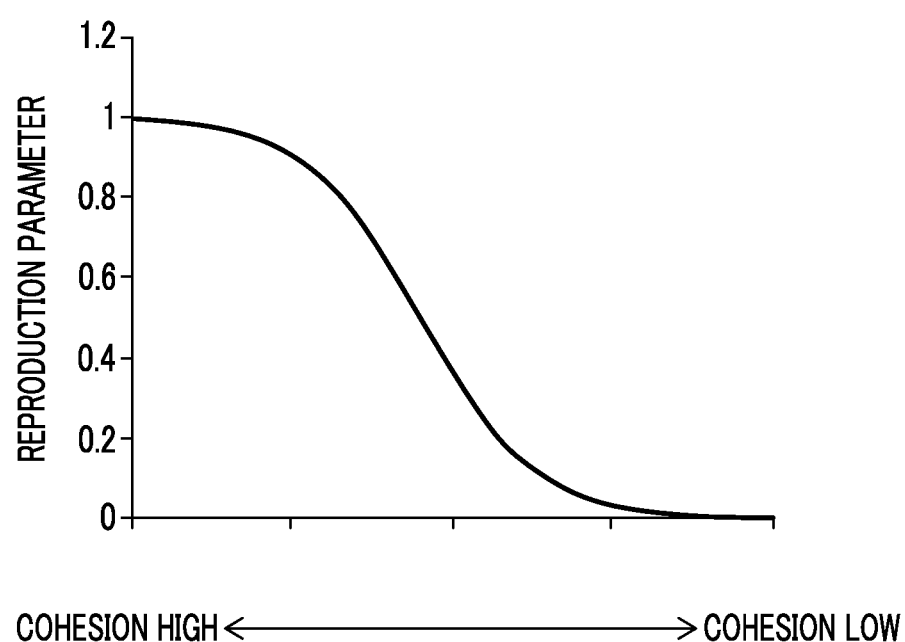
FIG. 10 is a diagram illustrating an example of a correspondence function of cohesion and a reproduction parameter.

In the second method, the reproduction parameter is determined using the spatial cohesion of the dark region calculated by the region cohesion calculation unit 11 and a reproduction characteristic in which the reproduction parameter and the cohesion are associated with each other. Here, the reproduction characteristic in which the reproduction parameter and the cohesion are associated with each other refers to a characteristic such that the reproduction parameter is larger as the cohesion of the dark region is higher, which is determined by a sensory evaluation experiment or the like executed in advance. For example, when the reproduction characteristic is a logistic function as shown in FIG. 10, the reproduction parameter α is calculated using the cohesion W by the following expression.

$$\alpha=1/(1+a\exp(-bW)) \quad \text{(Expression 7)}$$

Figure 11:
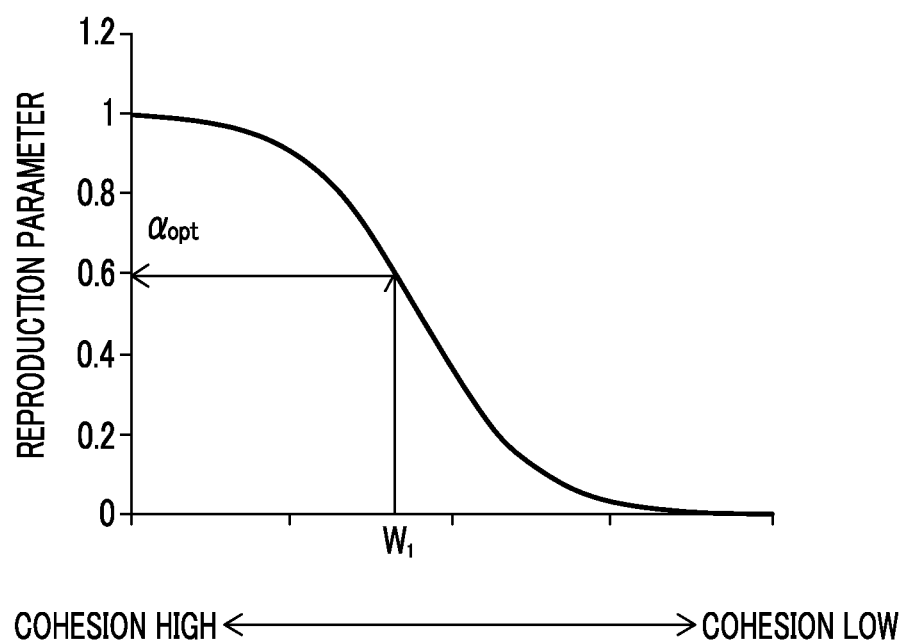
FIG. 11 is a diagram illustrating an example of a method for determining a reproduction parameter from cohesion using a correspondence function of the cohesion and the reproduction parameter.

Here, when a feature quantity indicating the spatial cohesion of the dark region calculated by the region cohesion calculation unit 11 is represented as $W_1$, a reproduction parameter $\alpha_{opt}$ is mechanically determined using the above function, as shown in FIG. 11. Further, as the reproduction characteristic in which the reproduction parameter and the cohesion are associated with each other, a function having any shape may be used as long as the function shows a characteristic such that the reproduction parameter is larger as the cohesion is higher.

Third Method

In the first method and the second method, the reproduction parameter is determined using the spatial cohesion at a specific brightness level, but in the third method, the reproduction parameter is determined using spatial cohesions at plural brightness levels. Specifically, when a level image obtained by dividing a luminance image into n levels respectively corresponding to n brightness ranges is represented as $I_i$, the cohesion that is a feature quantity in each level image is represented as $W(I_i)$ (in which i=1, 2, 3, . . . , n). Thus, when a weight of each level image is represented as $c_i$, the total cohesion $W_{total}$ that is the sum of the cohesions in the respective level images is expressed by the following expression (in which i=1, 2, 3, . . . , n).

$$W_{total} = \sum_{i=1}^{n} (c_i \times W(I_i))$$ (Expression 8)

Figure 12:
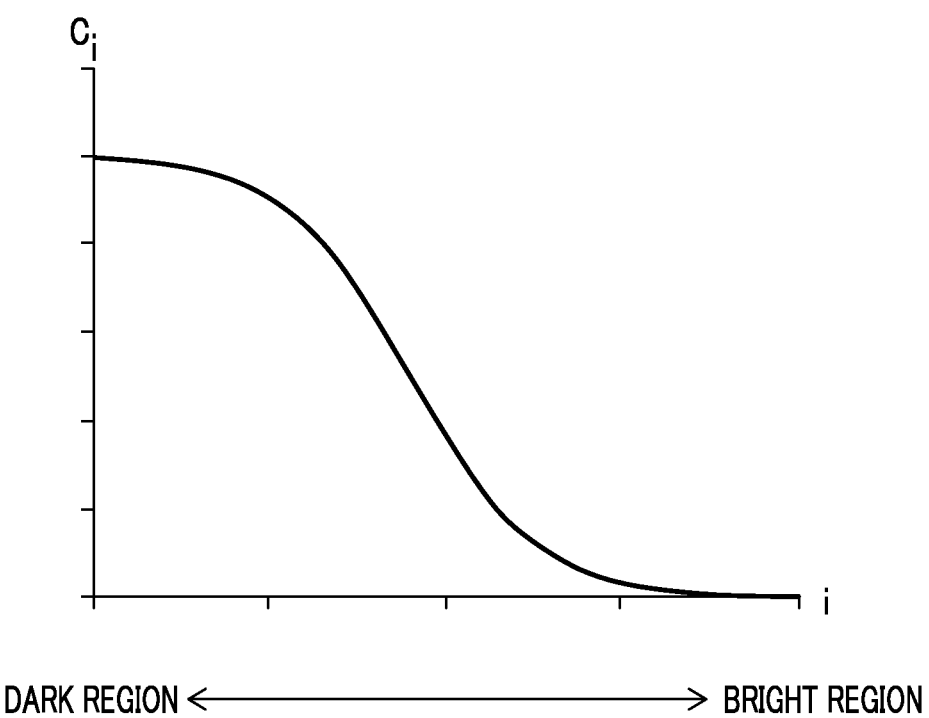
FIG. 12 is a diagram illustrating an example of a correspondence function of a number i of a brightness level and a weight $c_i$ of the brightness level, used in determining a reproduction parameter using cohesion at the plural brightness levels.
Figure 13:
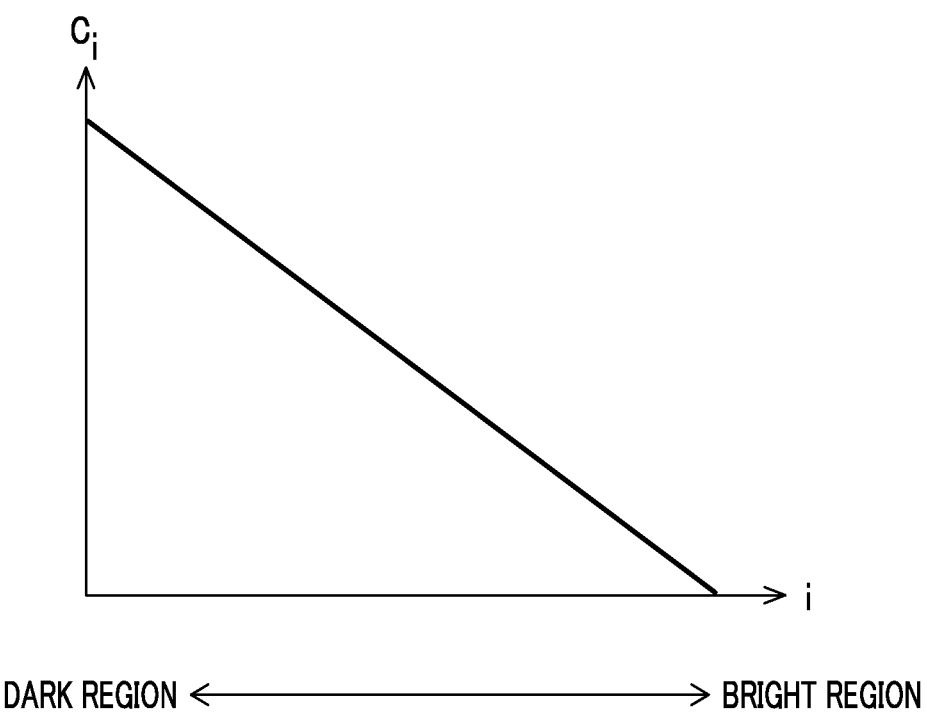
FIG. 13 is a diagram illustrating an example of a correspondence function of a number i of a brightness level and a weight $c_i$ of the brightness level, used in determining a reproduction parameter using cohesion at the plural brightness levels.

Here, $c_i$ may be determined to be larger as the level is a darker region using a logistic function shown in FIG. 12 or a linear function shown in FIG. 13. That is, if $I_i$ is set to represent a level image of a darker region as i is smaller and to represent a level image of a brighter region as i is larger, $c_i$ may be determined to be larger as i is smaller. The function of $c_i$ may have any shape. Further, the reproduction parameter $\alpha$ may be determined by the first method or the second method using the feature quantity $W_{total}$.

In the present exemplary embodiment, as an example of enhancement degree information, the reproduction parameter is used, and as an example of an enhancement degree information generation unit that generates the enhancement degree information based on the characteristic information, the reproduction parameter determination unit 14 is provided.

The visibility reproduction unit 15 is as described above. However, in the present exemplary embodiment, the luminance-enhanced reproduction image is generated using the luminance image and the reproduction parameter determined by the reproduction parameter determination unit 14, by Expression 1.

In the present exemplary embodiment, as an example of a luminance reproduction image generation unit that generates the luminance reproduction image, the visibility reproduction unit 15 is provided.

Figure 14:
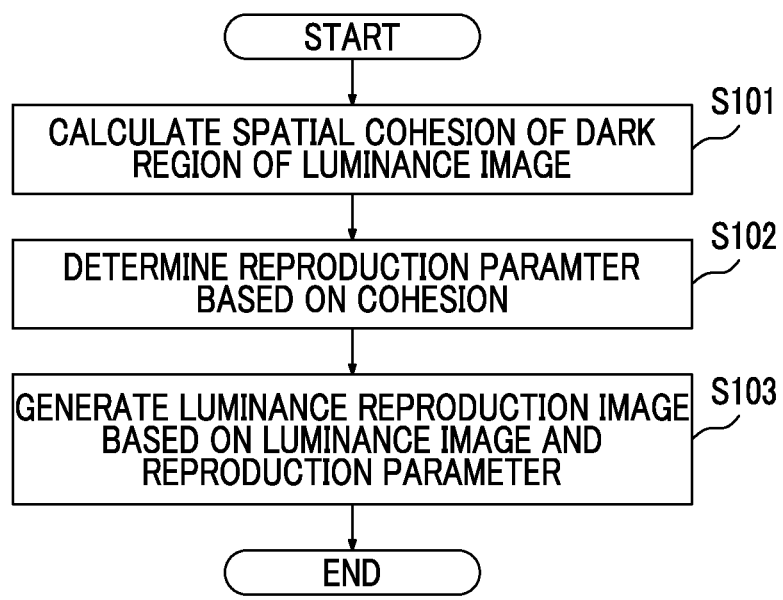
FIG. 14 is a flowchart illustrating an example of an operation of the image processing apparatus according to the first exemplary embodiment of the invention.

FIG. 14 is a flowchart illustrating an example of an operation of the image processing apparatus 10 according to the first exemplary embodiment of the invention.

If the luminance image is input, first, the region cohesion calculation unit 11 calculates the spatial cohesion of the dark region, as described above (step S101).

Then, the reproduction parameter determination unit 14 determines the reproduction parameter by any one of the above-described first to third methods based on the cohesion calculated in step S101 (step S102).

Finally, the visibility reproduction unit 15 generates the luminance reproduction image using Expression 1 based on the input luminance image and the reproduction parameter determined in step S102 (step S103).

The reproduction expression in the present exemplary embodiment is not limited to Expression 1. Any expression that does not affect the essence of the reproduction expression for performing the image enhancement (for performing control between the luminance image and an image enhanced to the maximum) may be used.

Further, hereinbefore, the reproduction parameter is determined so that the reproduction parameter $\alpha$ becomes larger as the cohesion is higher, but the invention is not limited thereto. According to processes, it may be preferable that the reproduction parameter is determined so that the reproduction parameter $\alpha$ becomes smaller as the cohesion is higher. Accordingly, the reproduction parameter may be determined so that the reproduction parameter $\alpha$ becomes larger or smaller as the cohesion is higher, that is, so that the change of the reproduction parameter with respect to the cohesion becomes a monotonous increase or a monotonous decrease.

Second Exemplary Embodiment

Figure 15:
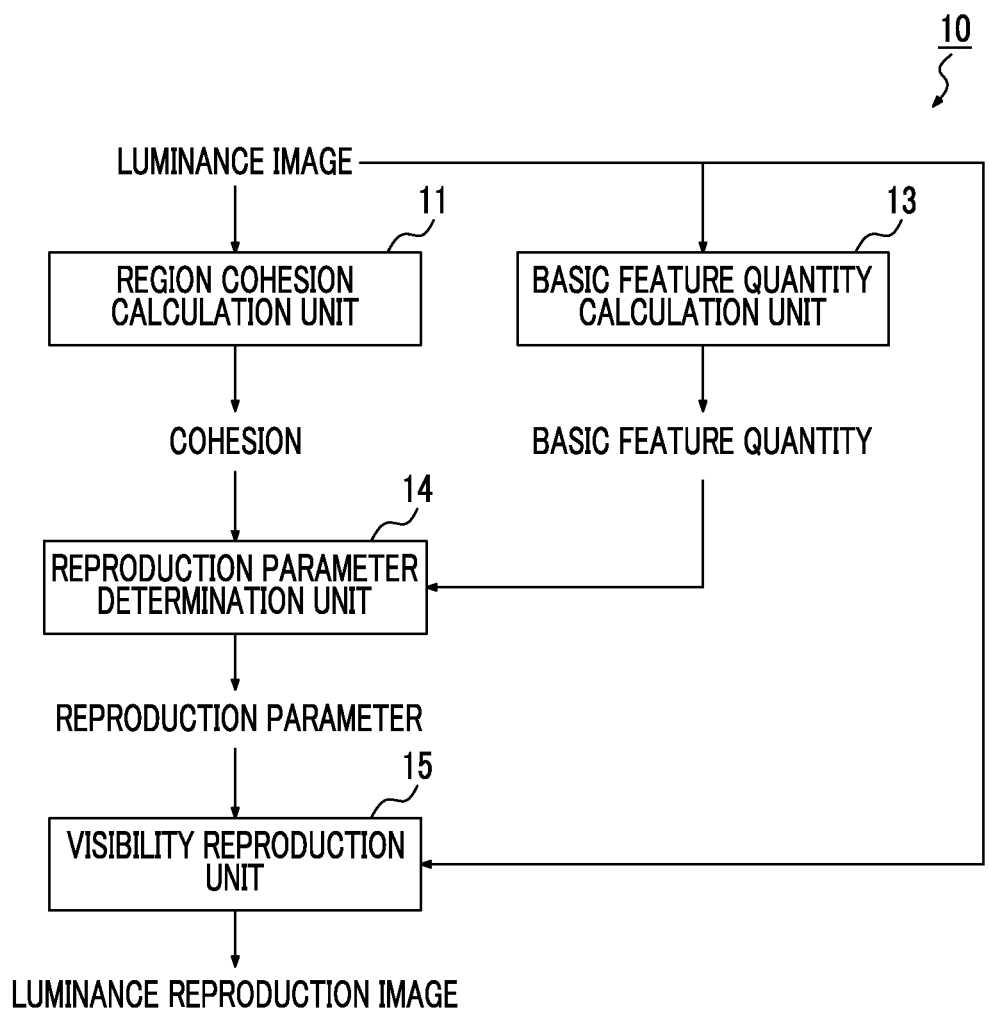
FIG. 15 is a block diagram illustrating an example of a functional configuration of an image processing apparatus according to a second exemplary embodiment of the invention.

FIG. 15 is a block diagram illustrating an example of a functional configuration of the image processing apparatus 10 according to a second exemplary embodiment of the invention. As shown in FIG. 15, the image processing apparatus 10 according to the present exemplary embodiment includes the region cohesion calculation unit 11, a basic feature quantity calculation unit 13, the reproduction parameter determination unit 14, and the visibility reproduction unit 15. Here, the region cohesion calculation unit 11 and the visibility reproduction unit 15 are the same as in the first exemplary embodiment, and the description will not be repeated. Hereinafter, only the basic feature quantity calculation unit 13 and the reproduction parameter determination unit 14 will be described.

The basic feature quantity calculation unit 13 calculates a basic feature quantity based on variation of an average value of the brightness or the brightness in a specific region or the entire region of the image.

The reproduction parameter determination unit 14 determines a reproduction parameter using the cohesion calculated by the region cohesion calculation unit 11 and the basic feature quantity calculated by the basic feature quantity calculation unit 13. Specifically, when the cohesion is represented as W and the basic feature quantity is represented as $K_1, K_2, K_3, \ldots, K_m$, the reproduction parameter $\alpha$ is expressed by a linear sum in which $a, b_1, b_2, b_3, \ldots, b_m$ are coefficients, as follows.

$$\alpha = a \times W + \sum_{i=1}^{m} (b_i \times K_i)$$ (Expression 9)

Here, the reproduction parameter is calculated by the linear sum, but the invention is not limited thereto. Any function capable of determining the reproduction parameter using the cohesion and one or more basic feature quantities may be used.

Third Exemplary Embodiment

Figure 16:
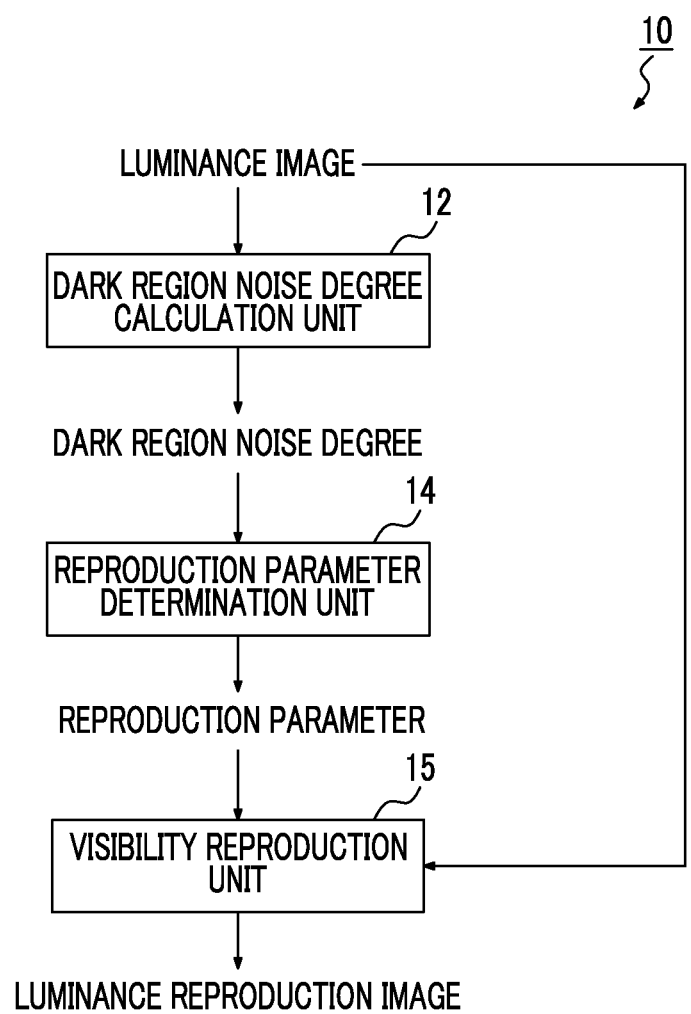
FIG. 16 is a block diagram illustrating an example of a functional configuration of an image processing apparatus according to a third exemplary embodiment of the invention.

FIG. 16 is a block diagram illustrating an example of a functional configuration of the image processing apparatus 10 according to a third exemplary embodiment of the invention. As shown in FIG. 16, the image processing apparatus 10 according to the present exemplary embodiment includes a dark region noise degree calculation unit 12, the reproduction parameter determination unit 14, and the visibility reproduction unit 15. Here, the visibility reproduction unit 15 is the same as in the first exemplary embodiment, and the description will not be repeated. Hereinafter, only the dark region noise degree calculation unit 12 and the reproduction parameter determination unit 14 will be described.

The dark region noise degree calculation unit 12 quantifies the degree of noise of a dark region generated due to image enhancement. Since the noise of the dark region is noticeable when generated in a flat region, a feature quantity related to a dark and flat region that is a dark region and a flat region is calculated.

Figure 17:
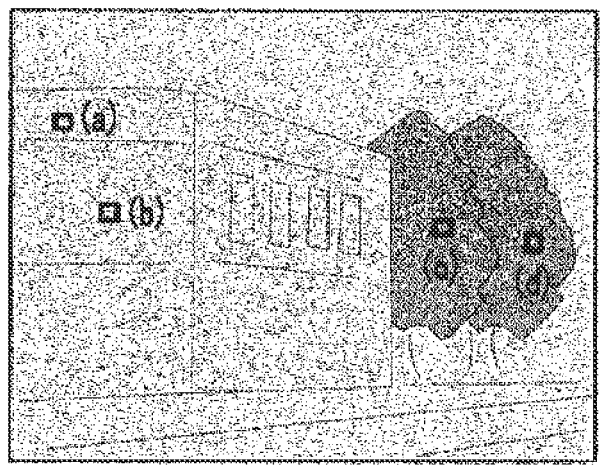
FIG. 17 is a diagram illustrating an example of a scene image for description of a method for calculating a dark region noise degree.
Figure 18A:
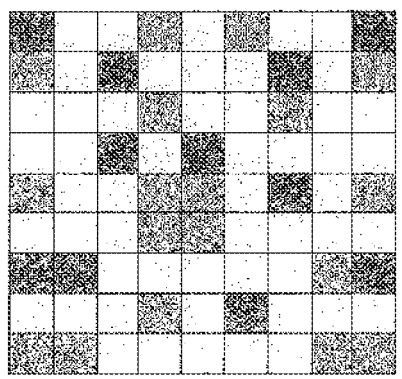
FIGS. 18A to 18D are diagrams illustrating examples of light and shade of respective pixels when a region used for calculation of a dark region noise degree is enlarged.
Figure 18B:
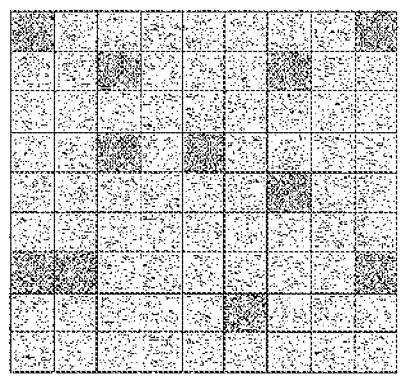
Figure 18C:
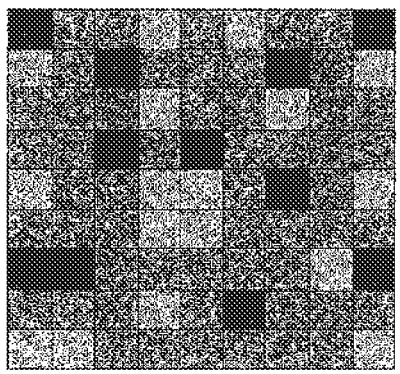
Figure 18D:
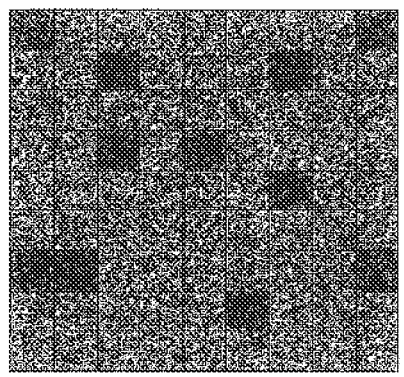

For example, the description will be made using regions (a) to (d) in FIG. 17. The regions (a) to (d) in FIG. 17 are regions including an observation pixel and peripheral pixels. The light and shade of the respective pixels when these regions are enlarged are respectively shown in FIGS. 18A to 18D. In FIGS. 18A to 18D, a thinner color represents a brighter pixel, and a thicker color represents a darker pixel. That is, in FIGS. 18A and 18B, the pixels are approximately configured by bright pixels, and in FIGS. 18C and 18D, the pixels are approximately configured by dark pixels. Further, the pixels shown in FIGS. 18A and 18C show noticeable mixture of the bright pixels and the dark pixels, and thus, have great variation of pixel values, compared with the pixels shown in FIGS. 18B and 18D. That is, the dark and flat region refers to a region where the observation pixel and the peripheral pixels are approximately configured by dark pixels and the variation of the pixel values is small, as shown in FIG. 18D.

Here, for example, when the number of pixels in a region is represented as M×N and a pixel value of a position (i, j) in the region is represented as f (i, j), the variation of the pixel values may be expressed by a standard deviation σ in Expression 11 using an average value μ in Expression 10.

$$\mu = \frac{1}{M \times N} \sum_{j=0}^{N-1} \sum_{i=0}^{M-1} f(i, j)$$ (Expression 10)

$$\sigma = \sqrt{\frac{1}{M \times N} \sum_{j=0}^{N-1} \sum_{i=0}^{M-1} (f(i, j) - \mu)^2}$$ (Expression 11)

The dark region noise degree calculation unit 12 calculates the standard deviation σ for all the pixels while shifting the observation pixel for each pixel on the luminance image, and divides the luminance image into plural level images according to values of the standard deviation σ. Further, the dark region noise degree calculation unit 12 determines a flat region using the level images. For example, a region included in the level images corresponding to the standard deviations σ equal to or smaller than a threshold value may be determined as the flat region.

Further, the dark region noise degree calculation unit 12 determines a region where the average value μ of the pixel values or the pixel value of the observation pixel is equal to or smaller than a threshold value as the dark region.

After determining the dark region and the flat region in this way, the dark region noise degree calculation unit 12 sets the area (the number of pixels) of the dark and flat region that refers to both the regions as a dark region noise degree. Here, when the flat region is dispersed over the plural level images respectively corresponding to the plural values of the standard deviation σ, the dark region noise degree calculation unit 12 calculates the areas of plural regions having different degrees of flatness in the dark region.

In the present exemplary embodiment, as an example of characteristic information indicating a characteristic relating to the size of the dark and flat region in the luminance image or enlargement degree information indicating the degree of enlargement of a region, the dark region noise degree is used, and as an example of a characteristic information acquisition unit that acquires the characteristic information or the enlargement degree information, the dark region noise degree calculation unit 12 is provided.

In the first exemplary embodiment, the plural cohesions respectively corresponding to the plural brightnesses is calculated as the feature quantity, but in the third exemplary embodiment, the areas of the plural dark regions respectively corresponding to the plural degrees of flatness are calculated as the feature quantity. Accordingly, it may be considered that the properties of the feature quantities are the same.

The reproduction parameter determination unit 14 determines the reproduction parameter using the dark region noise degree calculated by the dark region noise degree calculation unit 12. Specifically, the reproduction parameter determination unit 14 may determine the reproduction parameter so that the reproduction parameter α becomes smaller as the size of the dark region noise degree (the area of the dark and flat region) is larger. Hereinafter, a method for determining the reproduction parameter will be described.

In a first method and a second method, the reproduction parameter is determined using only the area of a dark region at the flattest level among the areas of the dark regions at the plural levels. On the other hand, in a third method, the reproduction parameter is determined using the areas of the dark regions at the plural levels.

First Method

The description will be made using the dark and flat region (which is herein assumed as the region at the flattest level among the dark regions) in the scene image in FIGS. 6 and 7. In FIG. 6, the tree portion is the dark and flat region, and in FIG. 7, the building portion is the dark and flat region. In this example, the area of the dark and flat region shown in FIG. 7 is larger than that of the dark and flat region shown in FIG. 6. Thus, it is determined that the image shown in FIG. 7 is an image in which the strength of the reproduction parameter is to be weakened, compared with the image shown in FIG. 6.

Second Method

Figure 19:
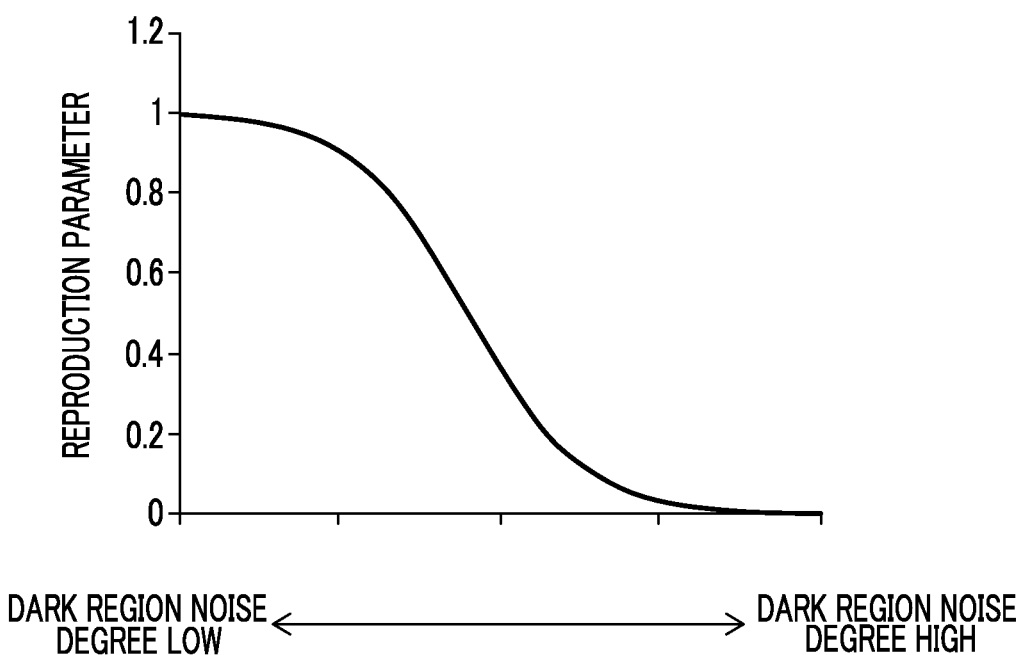
FIG. 19 is a diagram illustrating an example of a correspondence function of a dark region noise degree and a reproduction parameter.

In the second method, the reproduction parameter is determined using the dark region noise degree calculated by the dark region noise degree calculation unit 12 and reproduction characteristics in which the reproduction parameter and the dark region noise degree are associated with each other. Here, the reproduction characteristic in which the reproduction parameter and the dark region noise degree are associated with each other refers to a characteristic such that the reproduction parameter is smaller as the dark region noise degree is higher, which is determined by a sensory evaluation experiment or the like executed in advance. For example, when the reproduction characteristic is a logistic function as shown in FIG. 19, the reproduction parameter α is calculated using the dark region noise degree N by the following expression.

$$\alpha = 1/(1 + a\exp(-bN))$$ (Expression 12)

Figure 20:
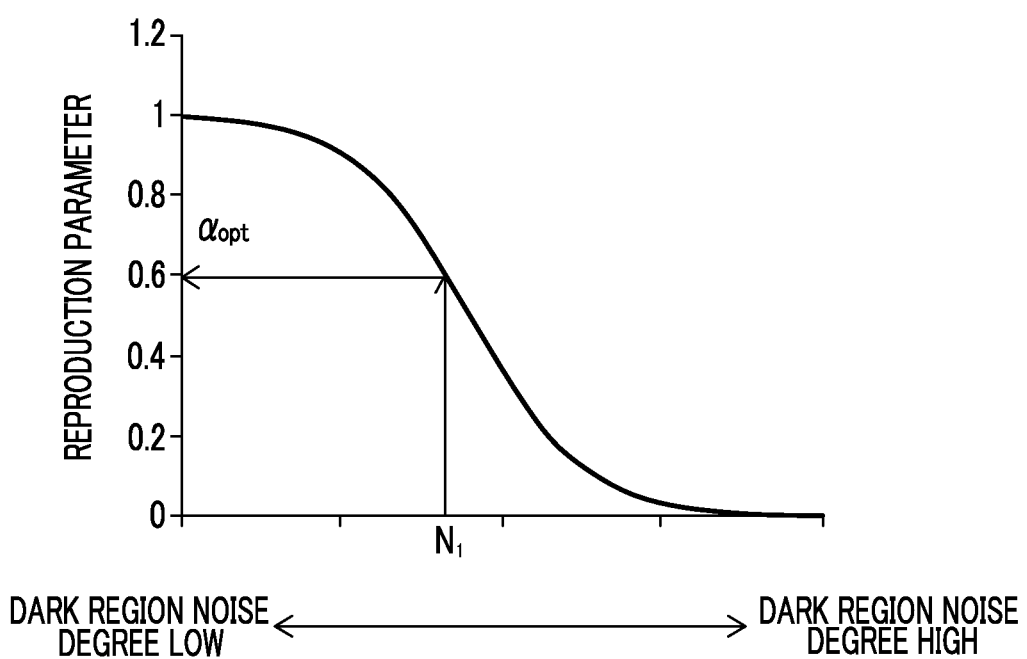
FIG. 20 is a diagram illustrating an example of a method for determining a reproduction parameter from a dark region noise degree using a correspondence function of the dark region noise degree and the reproduction parameter.

Here, when a feature quantity indicating the dark region noise degree calculated by the dark region noise degree calculation unit 12 is represented as $N_1$, a reproduction parameter $\alpha_{opt}$ is mechanically determined using the above function, as shown in FIG. 20. Further, as the reproduction characteristic in which the reproduction parameter and the dark region noise degree are associated with each other, a function having any shape may be used as long as the function shows a characteristic such that the reproduction parameter is smaller as the dark region noise degree is higher.

Third Method

In the first method and the second method, the reproduction parameter is determined using the area of the dark region at the flattest level, but in the third method, the reproduction parameter is determined using the areas of the dark regions in the levels corresponding to the plural degrees of flatness. Specifically, in n level images respectively corresponding to n degrees of flatness, the area of the dark region that is a feature quantity in each level image is represented as $N_i$ (in which i=1, 2, 3, ..., n). Thus, when a weight of each level image is represented as $c_i$, the total feature quantity $N_{total}$ that is the sum of the areas of the dark regions in the respective level images is expressed by the following expression (in which i=1, 2, 3, ..., n).

$$N_{total} = \sum_{i=1}^{n} (c_i \times N_i)$$ (Expression 13)

Figure 21:
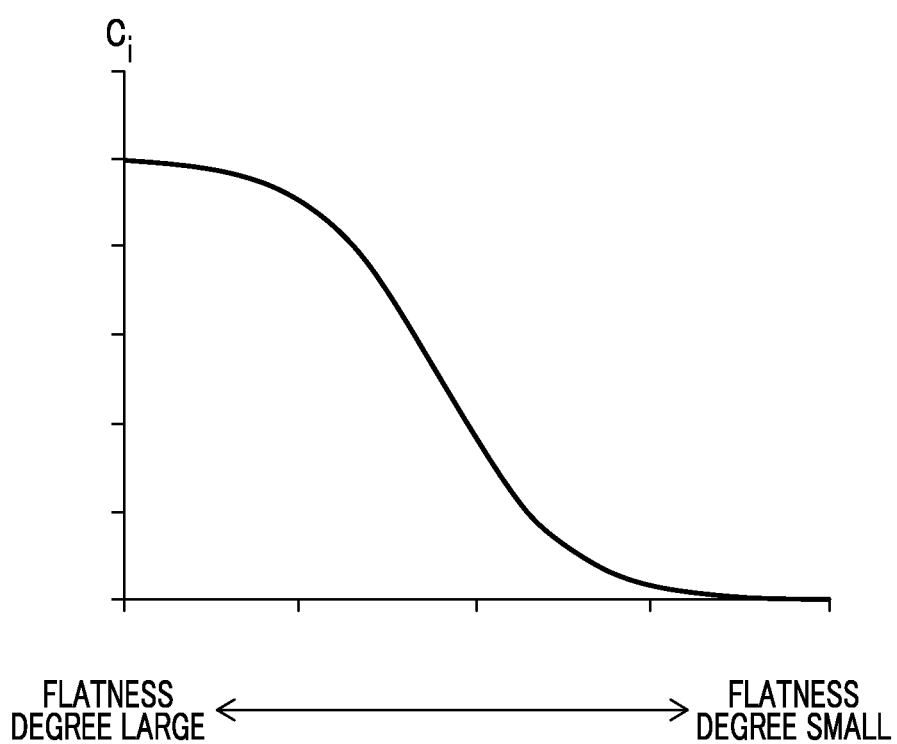
FIG. 21 is a diagram illustrating an example of a correspondence function of a number i of a flatness level and a weight $c_i$ of the flatness level, used in determining a reproduction parameter using the area of a dark region in the plural flatness levels.

Here, $c_i$ may be determined to be larger as the level has a higher degree of flatness using a logistic function shown in FIG. 21. That is, if the degree of flatness is set to be higher as i is smaller and set to be lower as i is larger, $c_i$ may be determined to be larger as i is smaller. The function of $c_i$ may have any shape. Further, the reproduction parameter α may be determined by the first method or the second method using the feature quantity $N_{total}$.

In the present exemplary embodiment, as an example of the enhancement degree information, the reproduction parameter is used, and as an example of the enhancement degree information generation unit that generates the enhancement degree information based on the characteristic information, the reproduction parameter determination unit 14 is provided.

Figure 22:
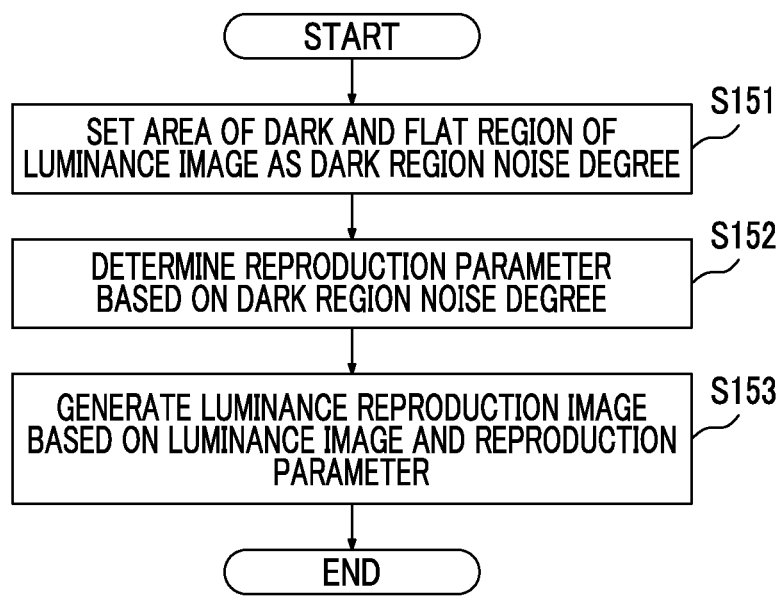
FIG. 22 is a flowchart illustrating an example of an operation of the image processing apparatus according to the third exemplary embodiment of the invention.

FIG. 22 is a flowchart illustrating an example of an operation of the image processing apparatus 10 according to the third exemplary embodiment of the invention.

If the luminance image is input, first, the dark region noise degree calculation unit 12 calculates the area of the dark and flat region as the dark region noise degree, as described above (step S151).

Then, the reproduction parameter determination unit 14 determines the reproduction parameter using any one of the above-described first to third methods based on the dark region noise degree calculated in step S151 (step S152).

Finally, the visibility reproduction unit 15 generates the luminance reproduction image using Expression 1 based on the input luminance image and the reproduction parameter determined in step S152 (step S153).

Fourth Exemplary Embodiment

Figure 23:
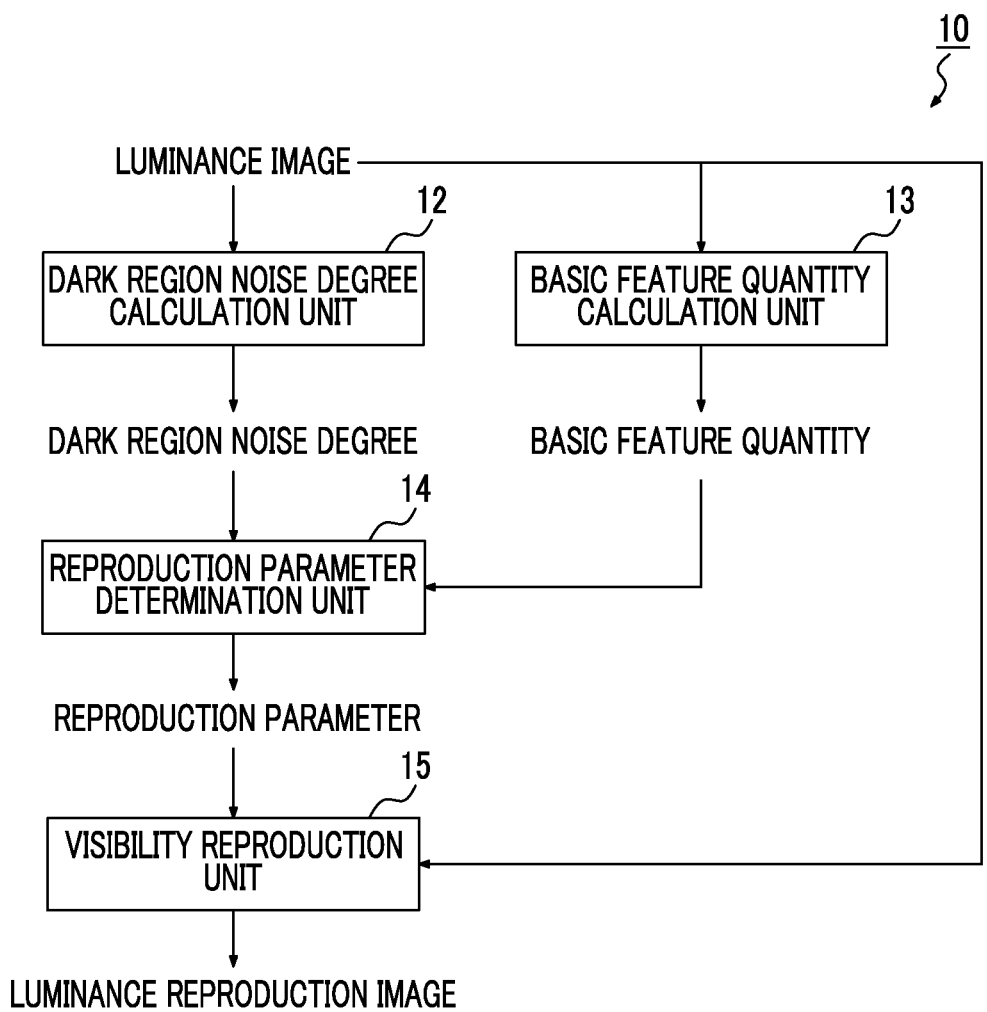
FIG. 23 is a block diagram illustrating an example of a functional configuration of an image processing apparatus according to a fourth exemplary embodiment of the invention.

FIG. 23 is a block diagram illustrating an example of a functional configuration of the image processing apparatus 10 according to a fourth exemplary embodiment of the invention. As shown in FIG. 23, the image processing apparatus 10 according to the present exemplary embodiment includes the dark region noise degree calculation unit 12, the basic feature quantity calculation unit 13, the reproduction parameter determination unit 14, and the visibility reproduction unit 15. Here, the visibility reproduction unit 15 is the same as in the first exemplary embodiment, the basic feature quantity calculation unit 13 is the same as in the second exemplary embodiment, and the dark region noise degree calculation unit 12 is the same as in the third exemplary embodiment, and thus, the description will not be repeated. Hereinafter, only the reproduction parameter determination unit 14 will be described.

The reproduction parameter determination unit 14 determines a reproduction parameter using the dark region noise degree calculated by the dark region noise degree calculation unit 12 and the basic feature quantity calculated by the basic feature quantity calculation unit 13. Specifically, when the dark region noise degree is represented as N and the basic feature quantity is represented as $K_1, K_2, K_3, \ldots,$ and $K_m$, the reproduction parameter α is expressed by an expression obtained by replacing W in Expression 9 with N.

Fifth Exemplary Embodiment

Figure 24:
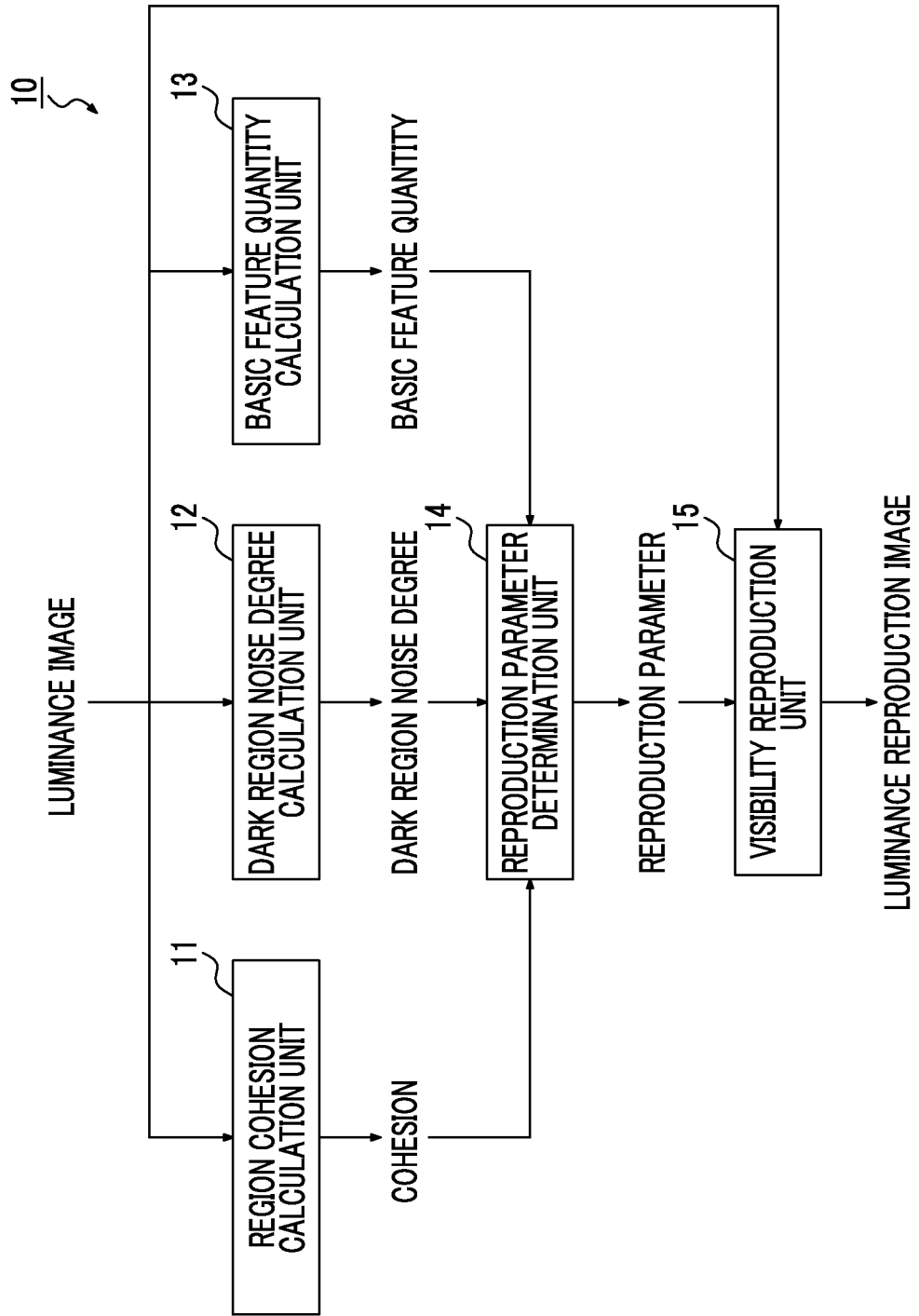
FIG. 24 is a block diagram illustrating an example of a functional configuration of an image processing apparatus according to a fifth exemplary embodiment of the invention.

FIG. 24 is a block diagram illustrating an example of a functional configuration of the image processing apparatus 10 according to a fifth exemplary embodiment of the invention. As shown in FIG. 24, the image processing apparatus 10 according to the present exemplary embodiment includes the region cohesion calculation unit 11, the dark region noise degree calculation unit 12, the basic feature quantity calculation unit 13, the reproduction parameter determination unit 14, and the visibility reproduction unit 15. Here, the region cohesion calculation unit 11 and the visibility reproduction unit 15 are the same as in the first exemplary embodiment, the basic feature quantity calculation unit 13 is the same as in the second exemplary embodiment, and the dark region noise degree calculation unit 12 is the same as in the third exemplary embodiment, and thus, the description will not be repeated. Hereinafter, only the reproduction parameter determination unit 14 will be described.

The reproduction parameter determination unit 14 determines a reproduction parameter using the cohesion calculated by the region cohesion calculation unit 11, the dark region noise degree calculated by the dark region noise degree calculation unit 12 and the basic feature quantity calculated by the basic feature quantity calculation unit 13. Specifically, when the cohesion is represented as W, the dark region noise degree is represented as N, and the basic feature quantity is represented as $K_1, K_2, K_3, \ldots, K_m$, the reproduction parameter α is expressed by a linear sum obtained by adding a term including N to Expression 9.

Sixth Exemplary Embodiment

Figure 25:
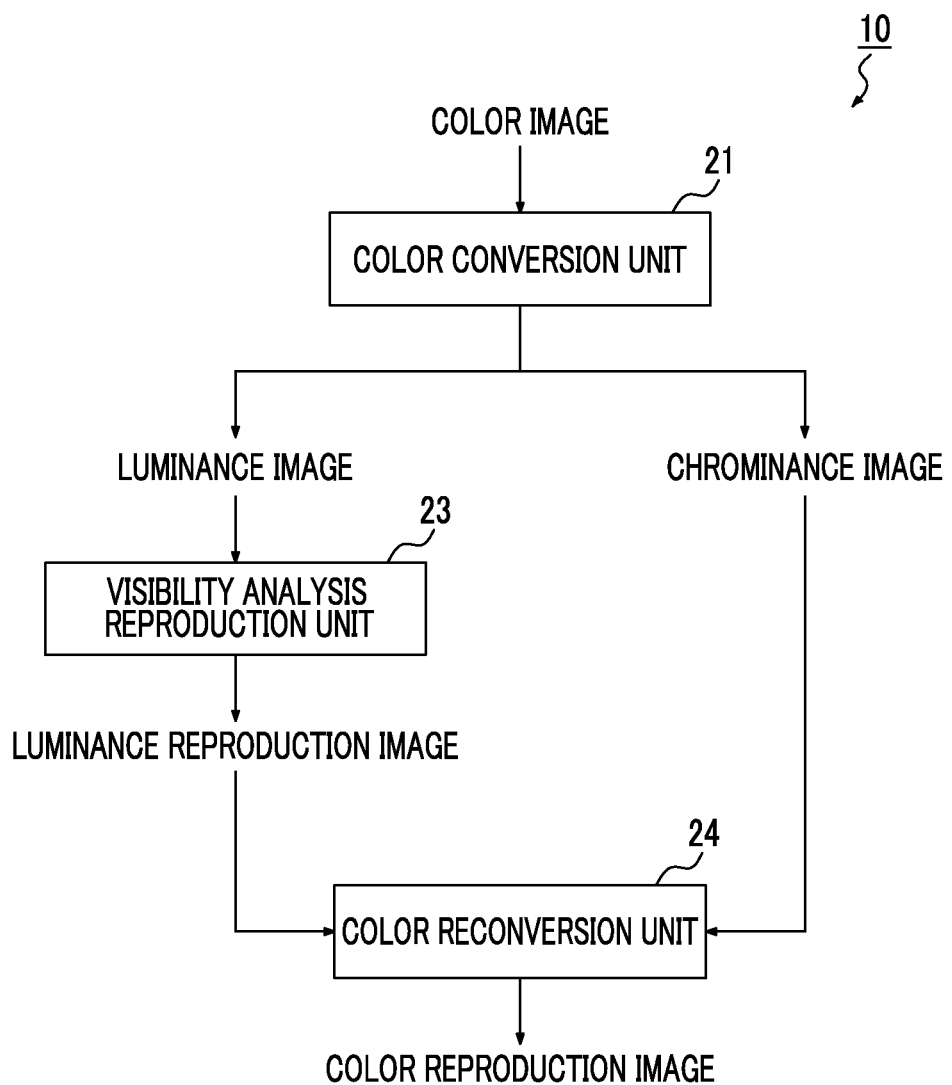
FIG. 25 is a block diagram illustrating an example of a functional configuration of an image processing apparatus according to a sixth exemplary embodiment of the invention.

FIG. 25 is a block diagram illustrating an example of a functional configuration of the image processing apparatus 10 according to a sixth exemplary embodiment of the invention. As shown in FIG. 25, the image processing apparatus 10 according to the present exemplary embodiment includes a color conversion unit 21, a visibility analysis reproduction unit 23, and a color reconversion unit 24. The sixth exemplary embodiment is an exemplary embodiment in a case where the first to fifth exemplary embodiments are applied to a color image.

The color conversion unit 21 converts a color image that is an original image into a luminance image in which a luminance component is a pixel value and a chrominance image in which a chrominance component is a pixel value. In many cases, since an RGB image that is generally represented by sRGB or the like is used as the color image, as such color conversion, conversion from RGB to YCbCr, conversion from RGB to L*a*b*, conversion from RGB to HSV, or the like may be used. The conversion may be performed using a preset conversion formula. In the present exemplary embodiment, the description will be made assuming that a color space after conversion is HSV. When the color space is HSV, the luminance image is set to one frame of a V image, and the chrominance image is set to two frames of H and S images.

In the present exemplary embodiment, as an example of a color conversion unit that performs the color conversion to convert the original image to the luminance image and the chrominance image, the color conversion unit 21 is provided.

The visibility analysis reproduction unit 23 calculates a feature quantity from the luminance image generated by the color conversion unit 21, and generates a luminance reproduction image according to the luminance image generated by the color conversion unit 21 and the feature quantity. Specifically, the luminance reproduction image is generated according to any one of the first to fifth exemplary embodiments.

After the luminance reproduction image is generated by the visibility analysis reproduction unit 23 and the chrominance image is generated by the color conversion unit 21, the color reconversion unit 24 performs reconversion to the color conversion of the color conversion unit 21. That is, the color reconversion unit 24 sets the luminance reproduction image and the chrominance image obtained by the series of processes according to the sixth exemplary embodiment to H^S^V^, and performs conversion from the H^S^V^ color space to the RGB color space, to thereby obtain a final color reproduction image.

In the present exemplary embodiment, as an example of a color reconversion unit that performs the reconversion to the color conversion performed by the color conversion unit, the color reconversion unit 24 is provided.

Seventh Exemplary Embodiment

Figure 26:
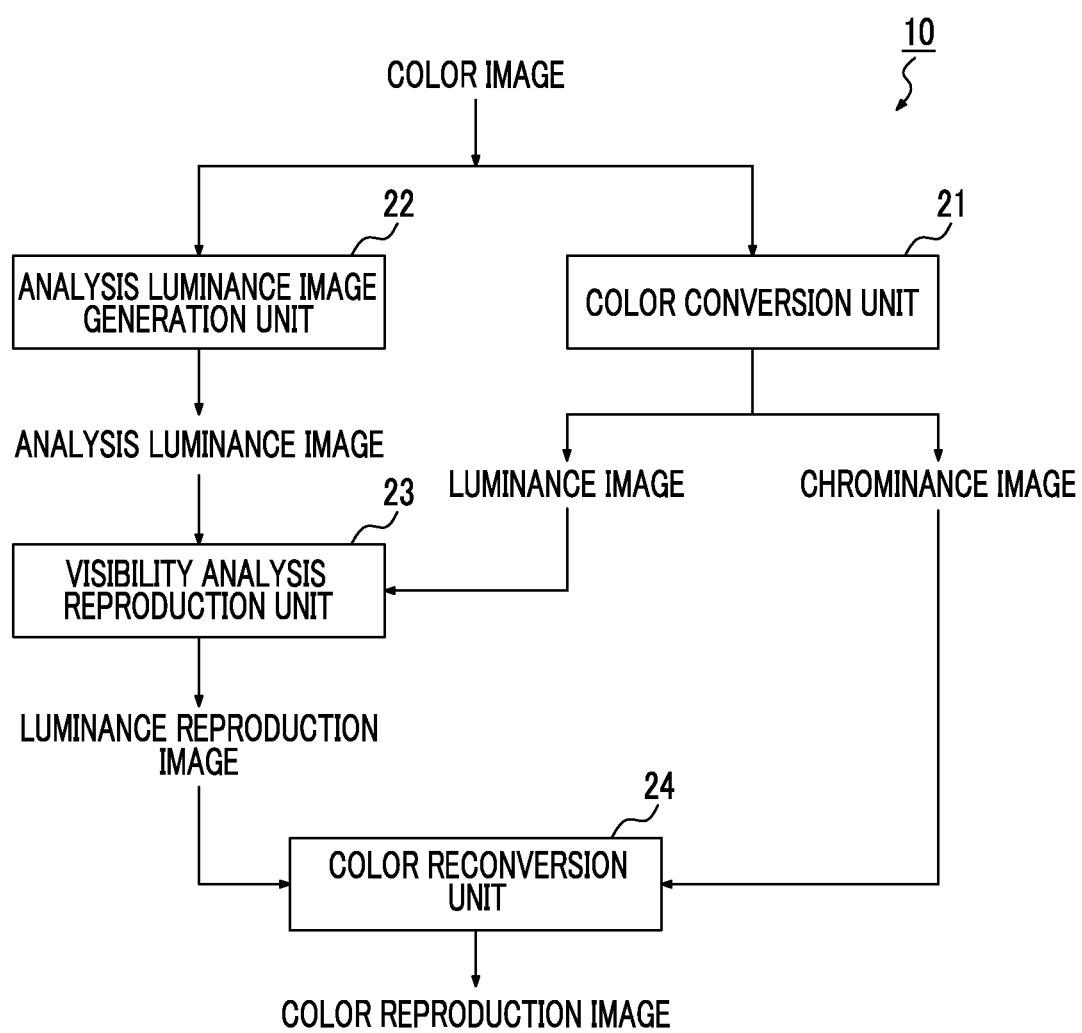
FIG. 26 is a block diagram illustrating an example of a functional configuration of an image processing apparatus according to a seventh exemplary embodiment of the invention.

FIG. 26 is a block diagram illustrating an example of a functional configuration of the image processing apparatus 10 according to a seventh exemplary embodiment of the invention. As shown in FIG. 26, the image processing apparatus 10 according to the present exemplary embodiment includes the color conversion unit 21, an analysis luminance image generation unit 22, the visibility analysis reproduction unit 23, and the color reconversion unit 24. Here, the color conversion unit 21 and the color reconversion unit 24 are the same as in the sixth exemplary embodiment, and the description will not be repeated. Hereinafter, only the analysis luminance image generation unit 22 and the visibility analysis reproduction unit 23 will be described.

The analysis luminance image generation unit 22 performs color conversion suitable for an analysis use different from that of the color conversion performed by the color conversion unit 21 to generate an analysis luminance image. In consideration of a human visual characteristic, it is considered that the luminance image for the image enhancement and the luminance image for calculation of the feature quantity do not match each other. For example, in color processing or color adjustment, the HSV color space formed by components intuitively and easily recognized, such as brightness and saturation, may be used, or the input RGB image may be used as it is. On the other hand, in analysis, it may be preferable that color conversion such as L*a*b*, YCbCr, YIQ, or the like that is closer to the human visual characteristic be used. In this way, since suitable color conversion may be different between the processing and the analysis, in the present exemplary embodiment, the color conversion for analysis in the analysis luminance image generation unit 22 and the color conversion for normal processing in the color conversion unit 21 are set to be different from each other.

In the present exemplary embodiment, as an example of a first luminance image, the analysis luminance image is used, and as an example of a luminance image generation unit that generates the first luminance image, the analysis luminance image generation unit 22 is provided. Further, in this case, the luminance image generated by the color conversion unit 21 is an example of a second luminance image.

The visibility analysis reproduction unit 23 calculates a feature quantity from the analysis luminance image generated by the analysis luminance image generation unit 22, and generates the luminance reproduction image according to the luminance image generated by the color conversion unit 21 and the feature quantity. Specifically, the luminance reproduction image is generated according to any one of the first to fifth exemplary embodiments.

[Hardware Configuration of Image Processing Apparatus]

The image processing apparatus 10 in the present exemplary embodiments may be realized as image processing software installed in a personal computer (PC), for example, but typically, is realized as the image processing apparatus 10 that performs image reading and image formation.

Figure 27:
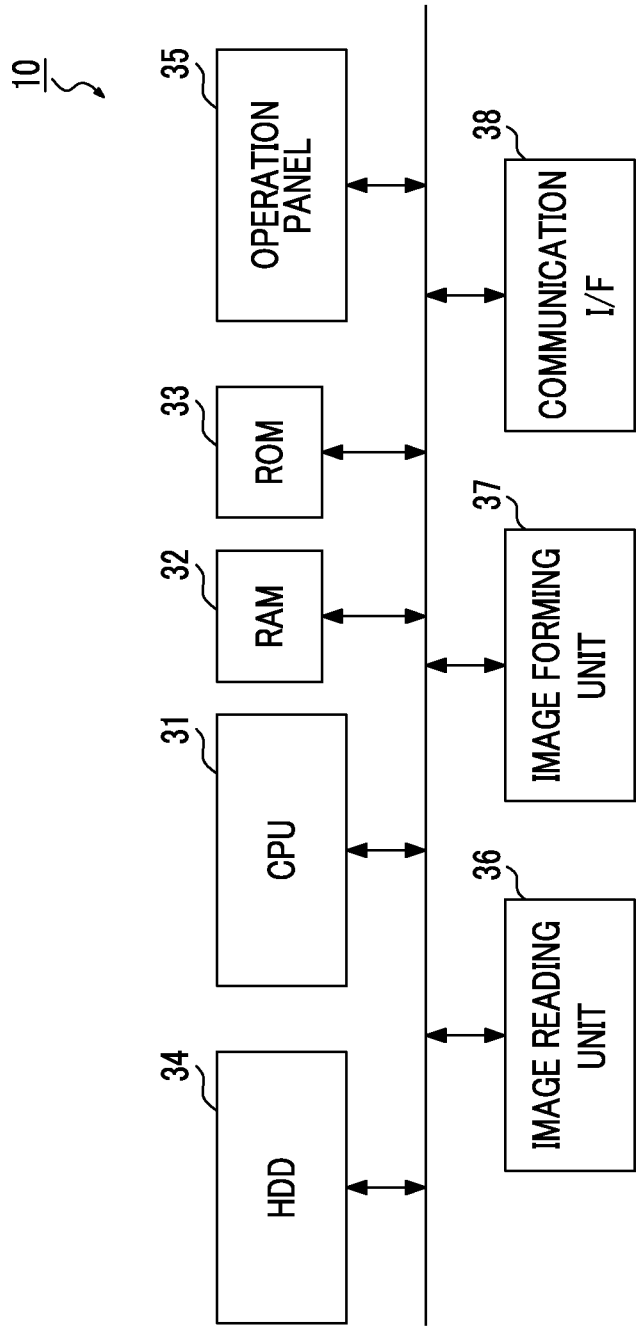
FIG. 27 is a block diagram illustrating an example of a hardware configuration of an image processing apparatus according to an exemplary embodiment of the invention.

FIG. 27 is a block diagram illustrating an example of a hardware configuration of such the image processing apparatus 10. As shown in FIG. 27, the image processing apparatus 10 includes a central processing unit (CPU) 31, a random access memory (RAM) 32, a read only memory (ROM) 33, a hard disk drive (HDD) 34, an operation panel 35, an image reading unit 36, an image forming unit 37, and a communication interface (hereinafter, referred to as a "communication I/F") 38.

The CPU 31 loads various programs stored in the ROM 33 or the like onto the RAM 32 to execute the programs, thereby executing various functions to be described later.

The RAM 32 is used as a work memory or the like of the CPU 31.

The ROM 33 stores the various programs executed by the CPU 31.

The HDD 34 stores image data read by the image reading unit 36, or image data or the like used for image formation in the image forming unit 37, which is a magnetic disk device, for example.

The operation panel 35 is a touch panel on which a variety of information is displayed or an operation input of a user is received. Here, the operation panel 35 includes a display on which the variety of information is displayed, and a position detection sheet that detects a position indicated by a finger, a stylus pen or the like.

The image reading unit 36 reads an image recorded on a recording medium such as a sheet. Here, the image reading unit 36 is a scanner, for example, which may employ a CCD type in which reflection light with respect to light irradiated onto an original document from a light source is reduced by a lens and is received by a charge coupled device (CCD), or a CIS type in which reflection light with respect to light sequentially irradiated onto an original document from an LED light source is received by a contact image sensor (CIS).

The image forming unit 37 forms an image onto a recording medium. Here, the image forming unit 37 is a printer, for example, which may employ an electrophotographic type in which toner attached on a photosensitive body is transferred onto a recording medium to form an image, or an ink jet type in which ink is ejected onto a recording medium to form an image.

The communication I/F 38 transmits and receives a variety of information between the image processing apparatus 10 and another apparatus through a network.

A program for realizing the present exemplary embodiments may be provided through a communication device, or may be provided in a state of being stored in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
  a characteristic information acquisition unit that acquires characteristic information indicating a characteristic relating to at least any one of distribution of a specific brightness region and a size of a dark and flat region in a luminance image;
  an enhancement degree information generation unit that generates enhancement degree information indicating a degree of enhancement of a specific component that affects image quality of the luminance image, based on the characteristic information; and
  a luminance reproduction image generation unit that generates a luminance reproduction image obtained by reproducing the specific component of the luminance image so as to be enhanced to a degree of enhancement indicated by the enhancement degree information.

2. The image processing apparatus according to claim 1, wherein
  the characteristic information acquisition unit acquires cohesion degree information indicating a degree of cohesion of a dark region in the luminance image as the characteristic information indicating a characteristic relating to the distribution of the specific brightness region in the luminance image, and
  the enhancement degree information generation unit generates the enhancement degree information so that the degree of enhancement indicated by the enhancement degree information becomes higher or lower as the degree of cohesion indicated by the cohesion degree information is higher.

3. The image processing apparatus according to claim 2, further comprising:
  a luminance image generation unit that generates a first luminance image in which a luminance component of an original image is a pixel value from the original image;
  a color conversion unit that performs color conversion for converting the original image to a second luminance image in which the luminance component of the original image is a pixel value and a chrominance image in which a chrominance component of the original image is a pixel value; and
  a color reconversion unit that performs reconversion to a color conversion performed by the color conversion unit for the luminance reproduction image and the chrominance image, wherein
  the characteristic information acquisition unit acquires the characteristic information indicating a characteristic relating to at least any one of distribution of a specific brightness region in the first luminance image and a size of a dark and flat region, and
  the luminance reproduction image generation unit generates the luminance reproduction image obtained by reproducing the specific component of the second luminance image so as to be enhanced to a degree of enhancement indicated by the enhancement degree information.

4. The image processing apparatus according to claim 1, wherein
  the characteristic information acquisition unit acquires cohesion degree information indicating a degree of cohesion of a dark region in the luminance image as the characteristic information indicating a characteristic relating to the distribution of the specific brightness region in the luminance image, and
  the enhancement degree information generation unit generates the enhancement degree information using a function in which the degree of cohesion and the degree of enhancement are associated with each other so that the degree of enhancement indicated by the enhancement degree information becomes higher or lower as the degree of cohesion indicated by the cohesion degree information is higher.

5. The image processing apparatus according to claim 4, further comprising:
  a luminance image generation unit that generates a first luminance image in which a luminance component of an original image is a pixel value from the original image;
  a color conversion unit that performs color conversion for converting the original image to a second luminance image in which the luminance component of the original image is a pixel value and a chrominance image in which a chrominance component of the original image is a pixel value; and
  a color reconversion unit that performs reconversion to a color conversion performed by the color conversion unit for the luminance reproduction image and the chrominance image, wherein
  the characteristic information acquisition unit acquires the characteristic information indicating a characteristic relating to at least any one of distribution of a specific brightness region in the first luminance image and a size of a dark and flat region, and
  the luminance reproduction image generation unit generates the luminance reproduction image obtained by reproducing the specific component of the second luminance image so as to be enhanced to a degree of enhancement indicated by the enhancement degree information.

6. The image processing apparatus according to claim 1, wherein
  the characteristic information acquisition unit acquires cohesion degree information indicating a degree of cohesion of a region of each brightness among a plurality of brightnesses in the luminance image as the characteristic information indicating a characteristic relating to the distribution of the specific brightness region in the luminance image, and
  the enhancement degree information generation unit generates the enhancement degree information based on the cohesion degree information and a weight of each brightness among the plurality of brightnesses.

7. The image processing apparatus according to claim 6, wherein
  the enhancement degree information generation unit uses a weight that becomes larger as the brightness is lower, as the weight of each brightness among the plurality of brightnesses.

8. The image processing apparatus according to claim 7, further comprising:
   a luminance image generation unit that generates a first luminance image in which a luminance component of an original image is a pixel value from the original image;
   a color conversion unit that performs color conversion for converting the original image to a second luminance image in which the luminance component of the original image is a pixel value and a chrominance image in which a chrominance component of the original image is a pixel value; and
   a color reconversion unit that performs reconversion to a color conversion performed by the color conversion unit for the luminance reproduction image and the chrominance image, wherein
   the characteristic information acquisition unit acquires the characteristic information indicating a characteristic relating to at least any one of distribution of a specific brightness region in the first luminance image and a size of a dark and flat region, and
   the luminance reproduction image generation unit generates the luminance reproduction image obtained by reproducing the specific component of the second luminance image so as to be enhanced to a degree of enhancement indicated by the enhancement degree information.

9. The image processing apparatus according to claim 6, further comprising:
   a luminance image generation unit that generates a first luminance image in which a luminance component of an original image is a pixel value from the original image;
   a color conversion unit that performs color conversion for converting the original image to a second luminance image in which the luminance component of the original image is a pixel value and a chrominance image in which a chrominance component of the original image is a pixel value; and
   a color reconversion unit that performs reconversion to a color conversion performed by the color conversion unit for the luminance reproduction image and the chrominance image, wherein
   the characteristic information acquisition unit acquires the characteristic information indicating a characteristic relating to at least any one of distribution of a specific brightness region in the first luminance image and a size of a dark and flat region, and
   the luminance reproduction image generation unit generates the luminance reproduction image obtained by reproducing the specific component of the second luminance image so as to be enhanced to a degree of enhancement indicated by the enhancement degree information.

10. The image processing apparatus according to claim 1, wherein
    the characteristic information acquisition unit acquires enlargement degree information indicating a degree of enlargement of the dark and flat region in the luminance image as the characteristic information indicating a characteristic relating to a size of the dark and flat region in the luminance image, and
    the enhancement degree information generation unit generates the enhancement degree information so that the degree of enhancement indicated by the enhancement degree information becomes lower as a degree of enlargement indicated by the enlargement degree information is higher.

11. The image processing apparatus according to claim 10, further comprising:
    a luminance image generation unit that generates a first luminance image in which a luminance component of an original image is a pixel value from the original image;
    a color conversion unit that performs color conversion for converting the original image to a second luminance image in which the luminance component of the original image is a pixel value and a chrominance image in which a chrominance component of the original image is a pixel value; and
    a color reconversion unit that performs reconversion to a color conversion performed by the color conversion unit for the luminance reproduction image and the chrominance image, wherein
    the characteristic information acquisition unit acquires the characteristic information indicating a characteristic relating to at least any one of distribution of a specific brightness region in the first luminance image and a size of a dark and flat region, and
    the luminance reproduction image generation unit generates the luminance reproduction image obtained by reproducing the specific component of the second luminance image so as to be enhanced to a degree of enhancement indicated by the enhancement degree information.

12. The image processing apparatus according to claim 1, wherein
    the characteristic information acquisition unit acquires enlargement degree information indicating a degree of enlargement of the dark and flat region in the luminance image as the characteristic information indicating a characteristic relating to a size of the dark and flat region in the luminance image, and
    the enhancement degree information generation unit generates the enhancement degree information using a function in which the degree of enlargement and the degree of enhancement are associated with each other so that the degree of enhancement indicated by the enhancement degree information becomes lower as a degree of enlargement indicated by the enlargement degree information is higher.

13. The image processing apparatus according to claim 12, further comprising:
    a luminance image generation unit that generates a first luminance image in which a luminance component of an original image is a pixel value from the original image;
    a color conversion unit that performs color conversion for converting the original image to a second luminance image in which the luminance component of the original image is a pixel value and a chrominance image in which a chrominance component of the original image is a pixel value; and
    a color reconversion unit that performs reconversion to a color conversion performed by the color conversion unit for the luminance reproduction image and the chrominance image, wherein
    the characteristic information acquisition unit acquires the characteristic information indicating a characteristic relating to at least any one of distribution of a specific brightness region in the first luminance image and a size of a dark and flat region, and
    the luminance reproduction image generation unit generates the luminance reproduction image obtained by reproducing the specific component of the second luminance image so as to be enhanced to a degree of enhancement indicated by the enhancement degree information.

14. The image processing apparatus according to claim 1, wherein the characteristic information acquisition unit acquires enlargement degree information indicating a degree of enlargement of a dark region in a region of each flatness among a plurality of flatnesses in the luminance image as the characteristic information indicating a characteristic relating to a size of the dark and flat region in the luminance image, and the enhancement degree information generation unit generates the enhancement degree information based on the enlargement degree information and a weight of each flatness among the plurality of flatnesses.

15. The image processing apparatus according to claim 14, wherein the enhancement degree information generation unit uses a weight that becomes larger as the flatness is higher, as the weight of each flatness among the plurality of flatnesses.

16. The image processing apparatus according to claim 15, further comprising:
   a luminance image generation unit that generates a first luminance image in which a luminance component of an original image is a pixel value from the original image;
   a color conversion unit that performs color conversion for converting the original image to a second luminance image in which the luminance component of the original image is a pixel value and a chrominance image in which a chrominance component of the original image is a pixel value; and
   a color reconversion unit that performs reconversion to a color conversion performed by the color conversion unit for the luminance reproduction image and the chrominance image, wherein
   the characteristic information acquisition unit acquires the characteristic information indicating a characteristic relating to at least any one of distribution of a specific brightness region in the first luminance image and a size of a dark and flat region, and
   the luminance reproduction image generation unit generates the luminance reproduction image obtained by reproducing the specific component of the second luminance image so as to be enhanced to a degree of enhancement indicated by the enhancement degree information.

17. The image processing apparatus according to claim 14, further comprising:
   a luminance image generation unit that generates a first luminance image in which a luminance component of an original image is a pixel value from the original image;
   a color conversion unit that performs color conversion for converting the original image to a second luminance image in which the luminance component of the original image is a pixel value and a chrominance image in which a chrominance component of the original image is a pixel value; and
   a color reconversion unit that performs reconversion to a color conversion performed by the color conversion unit for the luminance reproduction image and the chrominance image, wherein
   the characteristic information acquisition unit acquires the characteristic information indicating a characteristic relating to at least any one of distribution of a specific brightness region in the first luminance image and a size of a dark and flat region, and
   the luminance reproduction image generation unit generates the luminance reproduction image obtained by reproducing the specific component of the second luminance image so as to be enhanced to a degree of enhancement indicated by the enhancement degree information.

18. The image processing apparatus according to claim 1, further comprising:
   a luminance image generation unit that generates a first luminance image in which a luminance component of an original image is a pixel value from the original image;
   a color conversion unit that performs color conversion for converting the original image to a second luminance image in which the luminance component of the original image is a pixel value and a chrominance image in which a chrominance component of the original image is a pixel value; and
   a color reconversion unit that performs reconversion to a color conversion performed by the color conversion unit for the luminance reproduction image and the chrominance image, wherein
   the characteristic information acquisition unit acquires the characteristic information indicating a characteristic relating to at least any one of distribution of a specific brightness region in the first luminance image and a size of a dark and flat region, and
   the luminance reproduction image generation unit generates the luminance reproduction image obtained by reproducing the specific component of the second luminance image so as to be enhanced to a degree of enhancement indicated by the enhancement degree information.

19. A non-transitory computer readable medium that stores a program that causes a computer to execute functions comprising:
   acquiring characteristic information indicating a characteristic relating to at least any one of distribution of a specific brightness region and a size of a dark and flat region in a luminance image;
   generating enhancement degree information indicating a degree of enhancement of a specific component that affects image quality of the luminance image, based on the characteristic information; and
   generating a luminance reproduction image obtained by reproducing the specific component of the luminance image so as to be enhanced to a degree of enhancement indicated by the enhancement degree information.

20. An image processing method comprising:
   acquiring characteristic information indicating a characteristic relating to at least any one of distribution of a specific brightness region and a size of a dark and flat region in a luminance image;
   generating enhancement degree information indicating a degree of enhancement of a specific component that affects image quality of the luminance image, based on the characteristic information; and
   generating a luminance reproduction image obtained by reproducing the specific component of the luminance image so as to be enhanced to a degree of enhancement indicated by the enhancement degree information.

* * * * *